Nov. 19, 1929. C. W. STRATFORD 1,736,018
SYSTEM OF TREATING HYDROCARBON DISTILLATES AND
APPARATUS USED IN CONNECTION THEREWITH
Filed Nov. 26, 1926   3 Sheets-Sheet 2
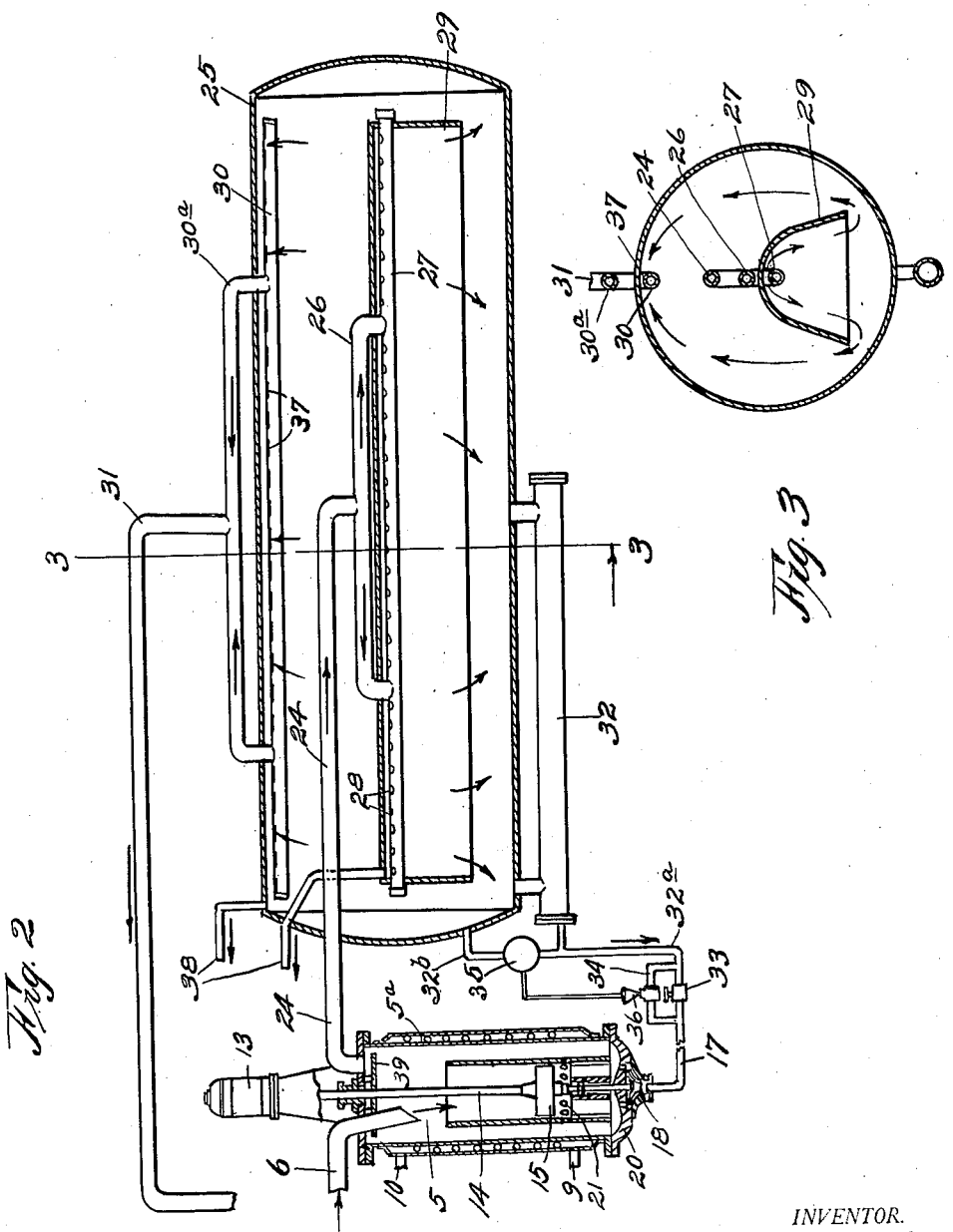
INVENTOR.
Charles Walcott Stratford
BY

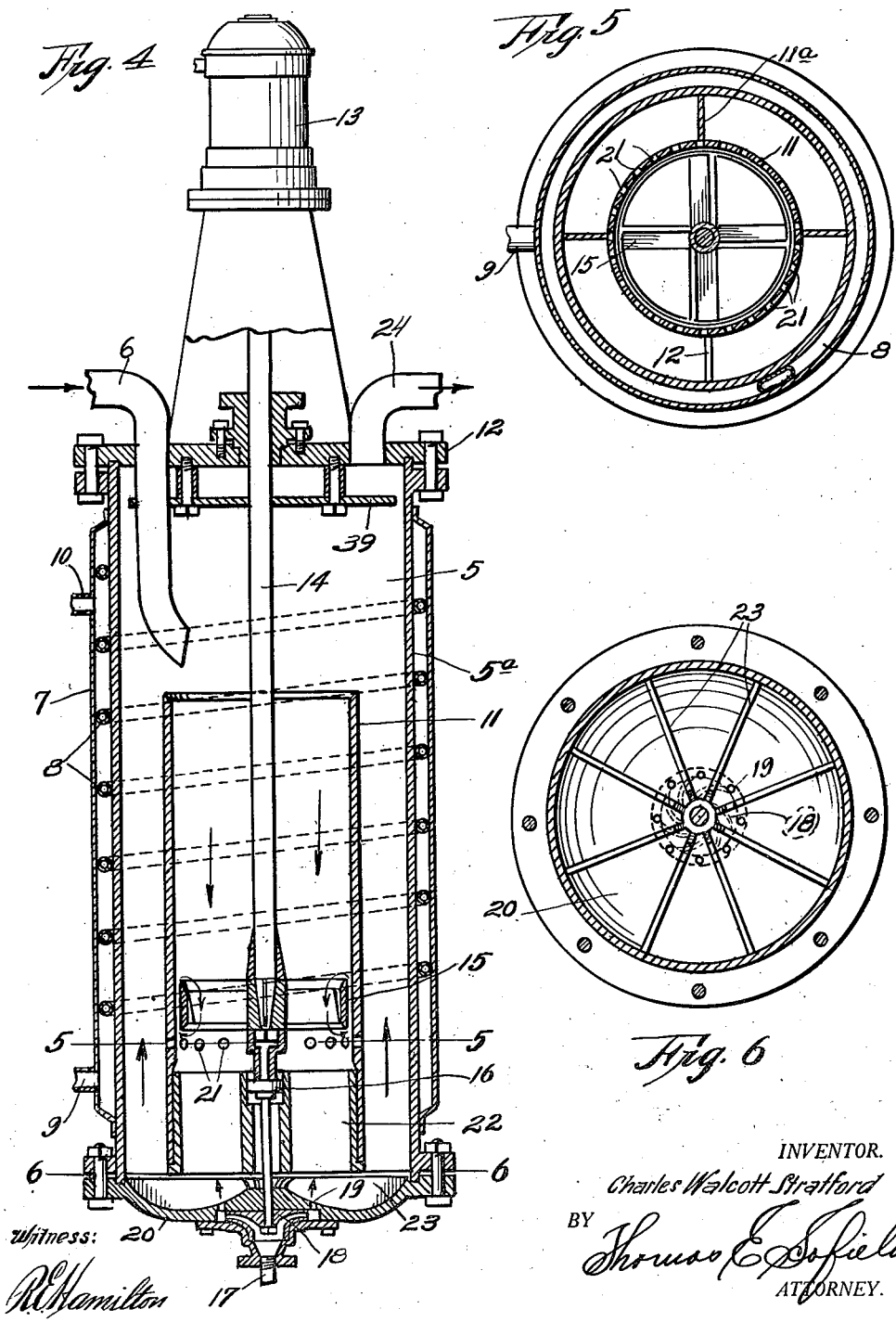

Patented Nov. 19, 1929

1,736,018

UNITED STATES PATENT OFFICE

CHARLES WALCOTT STRATFORD, OF SAN FRANCISCO, CALIFORNIA

SYSTEM OF TREATING HYDROCARBON DISTILLATES AND APPARATUS USED IN CONNECTION THEREWITH

Application filed November 26, 1926. Serial No. 150,678.

This invention relates to improvements in a system of treating hydrocarbon distillates for the purpose of removing color bearing, resinous and unsaturated bodies, or other objectionable compounds from distillate such as gasoline, pressure distillate, engine distillates, kerosene or other hydrocarbon products.

In the treatment of hydrocarbons to eliminate sulphur and other objectionable compounds the oil is given a chemical treatment or treatment with an agent which has selective chemical affinity or physical solvent powers, or adsorptive characteristics with reference to the bodies to be removed. When oxygen or air is present during the chemical treatment wasteful polymerization of otherwise useful constituents occurs.

The advantages of the present system lie chiefly in the utilization of a small self-contained apparatus for a given capacity, hence low first cost and the employment of contactors or mixers adapted to rapidly mix to a remarkable degree of intimacy the hydrocarbon and treating material. Furthermore the system affords an apparatus by means of which the treating rates may be regulated and are adjustable as to contact time. The separation after treatment is rapid and complete and the hydrocarbon distillate is not in contact with the acid for a longer period than necessary to effect proper treatment or sufficiently long to cause objectionable polymerization.

Fig. 2 is an elevational detail, with parts in section, of the contactor and settler or separator.

Fig. 3 is a view taken along the line 3—3 in Fig. 2.

Fig. 4 is an enlarged sectional view of the contactor shown in Fig. 2.

Fig. 5 is a view taken along the line 5—5 in Fig. 4.

Fig. 6 is a view taken along the line 6—6 in Fig. 4.

Figure 1:
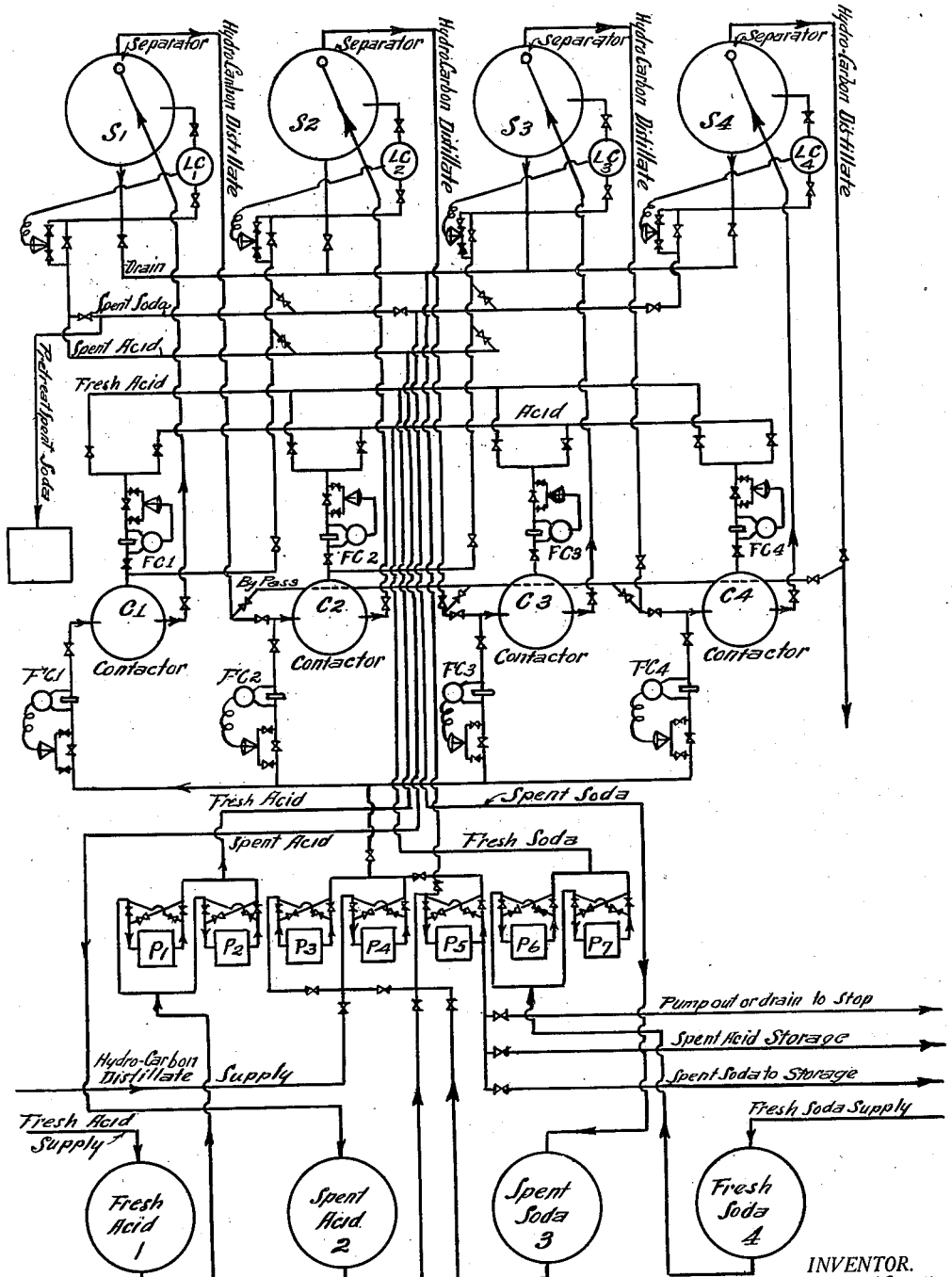
Fig. 1 is a flow diagram of the treating system.

Referring to the drawings and particularly to Fig. 1, at the bottom of the sheet are shown fresh acid, spent acid, spent soda and fresh soda reservoirs, designated as 1, 2, 3 and 4 respectively. Above the reservoirs or tanks are pumps for handling the acid, soda and distillate; these pumps are designatd as $P_1$ to $P_7$ inclusive. Pumps $P_1$ and $P_2$ distribute the fresh acid through the system. Pumps $P_6$ and $P_7$ distribute the soda solution. Pumps $P_3$ and $P_4$ supply the hydrocarbon distillate to the contactors. Pump $P_5$ discharges spent acid or spent soda from the system to storage. $P_5$ may also be used for pumping out hydrocarbon distillate from the system or evacuating any stage of the system without disturbing the operation. About the respective pumps $P_1$ to $P_7$ is shown reverse flow manifolding for evacuating the system of the different liquids.

Above the set of pumps are flow control mechanism designated as $FC_1$ $FC_2$ $FC_3$ and $FC_4$. The particular details of the mechanism form no part of the present invention; the interposition of the flow control mechanism in the lines serving solely to maintain proper operating conditions on the inlet lines to the contactors.

Above the contactors is a second system of flow controls also designated as $FC_1$ to $FC_4$ inclusive, the functions of these being to regulate flow of fresh treating agent to contactors.

The separate contactors in which the hydrocarbon distillates are treated with treating agents and which will hereafter be described in more detail, are designated as $C_1$, $C_2$, $C_3$ and $C_4$. Connected to the discharge from the separate contactors are the settlers or separators, hereinafter more fully described and designated in the flow chart as $S_1$, $S_2$, $S_3$ and $S_4$. Each of the separators are equipped with level control mechanism designated as $LC_1$ $LC_2$ $LC_3$ and $LC_4$.

To facilitate reading of the flow chart and to make the understanding of the system more comprehensive, certain of the lines have been designated and arrows placed upon the lines to show the direction of the flow of the liquid within the lines.

The system is so connected that the hydrocarbon distillate may be treated successively by separate acid and soda treatments or the distillate may be given an initial treat of soda and successive acid treats with a final soda treat.

It is recognized that it is common practice to successively treat hydrocarbon distillates in separate stages but the rapidity and effectiveness of the present method of contacting, together with the complete and efficient separation after treatment of a large quantity of oil by means of the apparatus hereinafter described, and the details of the mechanism used in the system provide the novelty of the present invention.

The hydrocarbon distillate to be treated is supplied by means of pumps $P_3$ and $P_4$ and is admitted to the initial contactor 5 by means of a pipe 6, as shown in Fig. 2. This contactor comprises a casing or shell, designated as $5^a$ in Fig. 4, which is jacketed as shown at 7. The jacket surrounding the shell is spaced from the shell by means of a spiral spacer pipe 8, which directs the flow of water which is circulated through the jacket from the inlet line 9 to the discharge line 10. An important feature of the cooling water circulation is the fact that the coolest water is supplied to the jacket at a point substantially where the acid and oil first contact and mix and where the greatest heat will occur, as hereinafter pointed out. Positioned within the shell $5^a$ is an open ended flow directing tube 11 supported by vertical support vanes $11^a$.

Mounted above the contactor 5 and bolted to the removable head 12 is a motor 13 supported upon a suitable standard. This motor is directly connected through a shaft 14 to a shrouded propeller 15 positioned in the lower part of the flow tube 11. The lower extremity of the shaft 14 is held in place on a floating ball bearing 16. The blades of the propeller are so pitched as to cause a downward circulation of the oil through the flow tube, thus the oil, introduced through the inlet pipe 6, completely fills the contactor, is picked up by the propeller and is driven at high velocity through the flow tube.

The fresh treating agents are supplied by their respective pumps and introduced into the bottom of the contactors through a line designated as 17. In Fig. 2 of the drawings this line is connected to the settler or separator, but it is understood from the flow chart that the initial stage of treatment will receive its supply of treating agent direct from the supply pump. The treating agent on entering the bottom of the contactor is picked up by a centrifugal pump 18 which discharges it at high velocity through a plurality of holes 19, shown in Figs. 4 and 6. These inlet holes are drilled through the bottom 20 of the contactor.

It will be noted also that this bottom is shaped to reverse the flow of the oil as it comes through the flow tube in order to direct the mixture in an upward direction in the annular space between the shell of the contactor and the outside of the flow tube.

In producing the flow of oil downwardly through the flow tube the oil discharged from the blades of the propeller will have a high velocity in axis and some rotation. This rotation of total liquid will cause the heavier liquids to partially separate from the lighter because of centrifugal force. This centrifugal force will project the heavier liquid through a series of radial holes or vents 21 drilled in the flow tube, and thus form a screen across the up-flowing liquid rising in the annular space between the outside of the flow tube and the shell of the contactor, again mixing with it. The high pressure at the discharge side of the propeller contributes to the formation of the screen by the projection of the liquids through the radial holes.

There is also a local cyclic movement around the shroud of the propeller and a zone of high turbulence existing between the moving rim of the propeller and the flow tube which are important factors in promoting the intimacy of mixture and dispersion attained.

Below the cross feed discharge vents 21 or holes through which the liquids are projected, is an element 22 termed an unwinding head; this head comprises a plurality of vanes positioned to reduce the rotation or spiral flow of the liquid produced by the propeller to a vertical flow; the pitch of these blades or vanes is sufficient to redirect the flow so that the liquid is directed vertically onto the bottom of the contactor where it meets the treating agents rising through the holes 19. To produce a straight-line flow radial vanes 23 in the bottom of the contactor further prevent rotary movement of the liquid. The object of eliminating rotation of the liquid mixture is to cause it to flow at uniform velocity in cross-section and thus avoid low pressure slow flowing eddies where separation of liquids and coalescence of treating agents occur.

The bottom of the contactor causes the mixed liquids to flow upwardly in the annular space outside the flow tube. The vanes supporting the tube further prevent any tendency toward rotation of the liquid in this annular space. The treating agents and oil being combined in the bottom of the contactor rise as a mixture and is subjected to the cooling action of the circulating water. The water is introduced at the bottom of the jacket and discharged at the top. As the mixture rises in the annular space outside the flow tube it is caused to pass through and mix with the screen of liquid projected through the cross feed discharge vents 21 so that a more intimate mixture is effected at this point.

After passing through the screen of liquids discharged through the cross-feed vents, the mixture rises and flows over the top of the flow tube and again passes downwardly as previously described. A portion of the mixture to an amount comparable to that charged will pass around the baffle 39 and be discharged from the top of the contactor through the outlet pipe 24.

This pipe 24 extends into the central part of the separator 25 where it divides into a header 26, the latter connected into a pipe 27 whose ends are closed and along the top of which are a plurality of perforations 28. The pipe 27 is positioned in top of a hood 29, which is open at the bottom, as shown in Fig. 3.

In the top of the separator is a pipe 30 having closed ends, along the upper portion of which is a narrow slit or a plurality of holes into which the oil overflows passing thence to the line 30ª and out through the discharge line 31. Connected into the bottom of the separator is a header 32 into which the line 32ª is connected; this line is controlled by a valve 33 and a by-pass line 34, automatically controlled by the liquid level device 35 in the line 32ᵇ, which manipulates the valve 36 to maintain constant level of the heavier treating agents in the header 32. The float in the liquid level control 35 is such that it will float upon the heavier acid or soda solution, but will sink in the lighter distillate, thus the separated treating material is maintained at a level in the header 32, while the liquid distillate may fill the separator and overflow into the upper discharge line 30. The discharge apertures or slots through which the liquid is withdrawn to the line 30 are shown at 37 in Fig. 3.

In operation the combined liquid treating material and oil pass from the contactor through the line 24 and are discharged from the top vents or holes in the line 27 beneath the hood 29. The mixture will flow downwardly until it reaches the lower lips of the hood, shown in Fig. 3, and during this slow downward flow the heavier treating material will separate by gravity, from the lighter distillate. Passing the lower lips of the hood the distillate rises to the discharge pipe 30, the flow in the separator, as shown in Fig. 3, by the arrows, is very slow so that the treating material which has a higher specific gravity than the distillate is separated out and gravitates to the lower header 32 while the distillate rises and overflows into the slot or narrow slotted apertures 37 in the discharge pipe 30. The primary object of introducing the mixture from the contactor through a manifold and discharging it through a plurality of holes is to distribute it in a uniform quantity per unit settling area and to reduce its velocity of flow. The velocity of flow is continuously reduced until the liquid rises to the position of greatest cross-section of the liquid body in the settler.

Furthermore the method of withdrawal through orifices in a long pipe is adapted to maintain a low outflow velocity. The advantage of the low velocity flow is to attain minimum disturbance to a separation of the liquids by gravity.

The treating material, either acid or soda solution separated out in the container 25, is directed through the line 32ª to the next succeeding contactor and that discharged from the final separator goes to spent storage designated as tanks 2 and 3 in Fig. 1. In the top of the settler and from the upper portion of the accelerating hood 29 are air vent lines 38.

In describing the mechanism shown in Figs. 2, 3, 4 and 5, one single stage of contacting and separation has been detailed, and the progress of the oil and treating material set out. It is understood, however, that the contacting and separation stages are separate stages which are integral portions of the system shown in the flow sheet. A single contacting stage being designated by the numerals $C_1$ $C_2$ $C_3$ and $C_4$; while the separating or settling stages in which the acid or soda are removed from the distillate are designated as $S_1$ $S_2$ $S_3$ and $S_4$. The novelty in the treatment lies particularly in the rapid circulation of a liquid through and around an open ended cylinder in substantially vertical streams and injecting and dispersing through this moving stream a treating material. The treatment is limited in the period of contacting so that objectionable polymerization is reduced. Furthermore the contactor is made air tight to prevent oxidation and polymerization of the oil during the contacting period.

Heretofore a number of different methods have been employed to refine hydrocarbon distillates, among which are the common agitating tanks, in which treating materials are added and agitated with air; turbulent tube methods in which the treating material and the hydrocarbon distillates are circulated through a plurality of tubes having friction return bent connections and finally settled in a stagnant pool. Baffle tubes and mechanical mixing devices have been used, as in the centrifugal pump mixing system, and separation by centrifuging. The disadvantages of the centrifugal pump mixing method lies primarily in the poor control of the contact time and separation of the treating agent from the hydrocarbon distillate because of the centrifugal force in the mixing pump, also high investment and power cost are restrictive factors. The use of homogenizers is effective for combining the distillate with the liquids, but the capacity of these devices are relatively limited, power consumption high, and distribution of treating agents in homogenizer difficult.

In the present treating system there is effected a highly efficient mechanical means for accomplishing extremely intimate combination or dispersion of the hydrocarbon distillate with the treating agents within a period of time limited only by the speed of the chemical reaction or physical solution, the air being excluded and appreciable loss of hydrocarbon vapor prevented by the closed system. In this system acid is made to flow counter-current to the flow of the hydrocarbon distillate for the purpose of economy of acid and better treating of the distillate. The use of the counter-current acid flow in the system reduces undesirable and wasteful polymerization of hydrocarbons and gives easy control of acid treating rate. Contact time is directly dependent upon the rate of charge and the volume of the contactor.

In normal operation the fresh acid is introduced to the third contactor or $C_3$, being separated in the third separator $S_3$ and passing thence to $C_2$ where it is again separated in $S_2$ and finally being directed to the first contator and after separation in $S_1$ passing to spent acid storage. The distillate on the other hand passes successively from $C_1$ to $S_1$ thence to $C_2$ and $S_2$ and to $C_3$ and $S_3$ and finally into $C_4$ and $S_4$, the final stage of contacting and separation being with caustic soda, or similar alkali treatment. The fresh soda is charged to $C_4$ or the fourth contactor and is separated in $S_4$ passing thence to spent soda storage while the finished distillate is discharged from $S_4$ through a line corresponding to the line designated as 31 in Fig. 2.

The treating liquids utilized are preferably sulphuric acid, $H_2SO_4$, caustic soda, or sodium plumbite, sodium or calcium hypochlorite water $H_2O$, or other acids or similar chemical agents, which have the ability of removing objectionable impurities from the hydrocarbon distillate. The system is not limited to any treating agent, the novelty lying particularly in the method of contacting and separation. In place of the separator shown a centrifuge or centrifugal separating means may be used in connection with the contactor.

I claim as my invention:

1. A contactor for treating hydrocarbon oils, comprising a casing having top inlet and discharge pipes, ports for introducing a treating liquid, a cylinder open at both ends and provided with holes near its lower end supported therein, a propeller within the cylinder for causing a continuous flow of the liquid through and around the open ended cylinder and the holes in the cylinder below the propeller permitting passage of the heavier liquids projected from the propeller by centrifugal force to pass therethrough with considerable velocity into the upward flowing stream outside of the cylinder, the means for introducing the treating liquid being at the bottom of the casing at substantially the lowest point of the circulating stream.

2. A contactor for treating hydrocarbon oils, comprising a casing having top inlet and discharge pipes, ports for introducing a treating liquid, a cylinder open at both ends and provided with holes near its lower end supported therein, a propeller within the cylinder for causing a continuous flow of the liquid through and around the open ended cylinder and the holes in the cylinder below the propeller permitting passage of the heavier liquids projected from the propeller by centrifugal force to pass therethrough with considerable velocity into the upward flowing stream outside of the cylinder, and an unwinding head below the propeller for eliminating the spin from the liquid stream.

3. A contactor for treating hydrocarbon oils, comprising a casing having top inlet and discharge pipes, ports for introducing a treating liquid, a cylinder open at both ends and provided with holes near its lower end supported therein, a propeller within said cylinder for causing a continuous flow of the liquid through and around the open ended cylinder and the holes in the cylinder below the propeller permitting passage of the heavier liquids projected from the propeller by centrifugal force to pass therethrough with considerable velocity into the upward flowing streams outside of the cylinder, the cylinder being supported within the casing by flues extending substantially the length of the cylinder and adapted to prevent spinning of the rising stream in the annular space between the cylinder and the casing.

4. The contacting step in a continuous process for treating oil, comprising rapidly circulating the liquid oil in a continuous stream through and around a hollow cylinder in a closed container, introducing the liquid oil to be treated to the hollow cylinder or vortex of the circulating fluid, withdrawing substantially an equal volume by stripping uniformly the liquid at the peripheral upper surface of the circulating oil and adding a treating liquid to the circulating stream.

5. The contacting step in a continuous process for treating oil, comprising rapidly circulating the liquid oil in a continuous stream through and around a hollow cylinder in a closed container, introducing the liquid oil to be treated to the hollow cylinder or vortex of the circulating fluid, withdrawing substantially an equal volume by stripping uniformly the liquid at the peripheral upper surface of the circulating oil and adding a treating liquid near the bottom of the circulating stream.

6. A contractor for treating oils comprising a closed casing, a tube open at both ends positioned therein and having a common axis therewith, said tube forming an annular space with the outer casing, an impeller within the tube for creating flow of the liquid downwardly in the tube and upwardly in the annular space, an inlet adapted to discharge the liquid fed to the inner tube, and means positioned at the top of the casing for stripping off the liquid in substantially equal volume to the liquid charged.

7. A contactor for treating oils comprising a closed casing, a tube open at both ends positioned therein and having a common axis therewith, said tube forming an annular space with the outer casing, an impeller within the tube for creating flow of the liquid downwardly in the tube and upwardly in the annular space, an inlet adapted to discharge the liquid fed to the inner tube, and means positioned at the top of the casing for stripping uniformly from the total circumferential surface of the up-flow stream a volume of liquid equal to the in-feed.

CHARLES WALCOTT STRATFORD.